United States Patent [19]
Asselborn et al.

[11] 3,819,073
[45] June 25, 1974

[54] APPARATUS FOR WITHDRAWING STRAND-LIKE MATERIAL IN LONGITUDINAL DIRECTION

[75] Inventors: Peter Asselborn; Werner Cramer, both of Bergisch Gladbach; Guenter Schmitz, Altenberg, all of Germany

[73] Assignee: Felten & Guilleaume Kabelwerke Aktiengesellschaft, Koln, Germany

[22] Filed: Jan. 24, 1973

[21] Appl. No.: 326,296

[30] Foreign Application Priority Data
Jan. 26, 1972 Germany............................ 2203474

[52] U.S. Cl................... 214/338, 226/112, 226/162
[51] Int. Cl............................................. B65h 51/00
[58] Field of Search ............ 214/338; 226/112, 162

[56] References Cited
UNITED STATES PATENTS

| | | |
|---|---|---|
| 2,990,091 | 6/1961 | Goldsworthy et al................ 226/112 |
| 3,083,391 | 4/1963 | Prange............................ 226/112 X |
| 3,474,946 | 10/1969 | Desplats et al...................... 226/112 |
| 3,549,072 | 12/1970 | Ito.................................... 226/112 |

*Primary Examiner*—Allen N. Knowles
*Attorney, Agent, or Firm*—Michael S. Striker

[57] ABSTRACT

Apparatus for withdrawing strand-like material in longitudinal direction, especially tubes and conductors for high frequency cables, in which at least two spaced gripping means coaxially surround the material movable in axial direction toward and away from each other and respectively grip the material during movement in the direction of withdrawal of the material and release the material during movement in the opposite direction.

10 Claims, 5 Drawing Figures

APPARATUS FOR WITHDRAWING STRAND-LIKE MATERIAL IN LONGITUDINAL DIRECTION

BACKGROUND OF THE INVENTION

The present invention relates to an apparatus for withdrawing strand-like material, especially tubes and conductors for high frequency cables, in longitudinal direction whereby the strand-like material is gripped by gripping means which are movable in the withdrawal direction.

Tube welding machines, extruders, tube corrguating machines, as well as machines for manufacturing cables not only need devices for the production and finishing such material, but also apparatus for withdrawing the finished material in the longitudinal direction. Such withdrawal apparatus are provided with gripping means which grip the strand-like material and move the same in longitudinal direction with a speed correlated to the apparatus for manufacturing the strand-like material. Such movement may be a translatory movement and/or a rotary movement.

Apparatus for withdrawing strand-like material in longitudinal direction are known in the art and such known apparatus may comprise two or more endless chains, belts or bands having parallel runs movable in the withdrawing direction and provided with gripping elements adapted to engage the strand-like material to be withdrawn. Such chains, belts or bands press by means of rollers or pressure pads against the strand-like material which is usually not gripped along the whole circumference thereof. When two diametrically arranged chains or similar endless flexible members are provided, then the material is engaged and pressed in two diametrically opposite directions so that, according to the elasticity of the material, the latter may yield in a plane normal to the direction of such pressure. The strand-like material may thereby be deformed to an eliptical cross section. In another known apparatus there are provided three chains, the active runs of which are displaced through an angle of 120° from each other, so that, correspondingly, three through 120° displaced pressure zones will result. Such an arrangement avoids an eliptical deforming of the withdrawn strand-like material, however, especially if thin walled tubes are to be withdrawn, it cannot be avoided that the tube wall will yield outwardly between the pressure zones so that the tube cross section will assume a substantially triangular configuration.

Another withdrawal apparatus is known in the art which, in order to avoid the above-mentioned disadvantageous deformation of the strand-like material, is provided on its endless chain with a plurality of spaced gripper elements which respectively comprise exchangeable semi-circular members corresponding to the diameter of the strand-like material to be withdrawn. These semi-circular members encompass the strand-like material substantially along the whole circumference so that the material cannot yield in any direction. The pressing of the gripper elements onto the material is accomplished in this known withdrawal apparatus in such a manner that the gripper elements are supported during movement of the strand-like material by means of rollers on guide rails. Compression springs are arranged between the roller mounting means and the gripper elements in order to maintain the necessary pressure with which the gripper elements are pressed against the strand-like material. This known withdrawal apparatus has the disadvantage that, during variations of the diameter of the strand-like material, a corresponding change of the pressure corresponding to the characteristic of the springs occurs. While it is theoretically possible to make the necessary corrections by changing the stressing of the springs, in actual practice this is hardly possible since the diameter of the strand-like material to be withdrawn may change during the production within certain limits. An additional disadvantage of this known withdrawal apparatus with two semi-circular gripping elements is that, during movement of the gripper elements to the closed position, there will occur a relative movement between the gripping elements and the strand-like material to be withdrawn especially if the latter is provided with a smooth outer surface. Such relative movements cause sliding of the engaging surfaces relative to each other so that the surface of the strand-like material may be scratched or slightly dented. Such a disadvantage will be especially pronounced if the cross section of the strand-like material, for instance tubes, will deviate from the ideal circular cross section, for instance if such tubes are provided with a longitudinally extending weld seam. On such tube portions which are engaged by the gripping elements, the tube cross section will, due to the pressure acting on the gripping elements, assume the circular configuration of the two semi-circular gripping elements, whereas in the tube sections located between the gripping elements the cross section of the tube section will remain unchanged. In tubes, especially in tubes which are used for coaxial high frequency cables, such periodically occurring changes in the cross section are especially disadvantageous since they will cause in the high frequency cable varying wave resistances, detrimental reflections and other disadvantageous results. Another disadvantage of this known withdrawal apparatus is the non-uniform pressure distribution between the relatively rigid gripping elements and the elastic tube walls. The radial pressure is at opposite ends of the semi-circular gripping elements smallest, whereas in the center between the opposite ends a maximum pressure will be reached. Evidently, the pressure distribution will also depend on the elasticity of the strand-like material to be withdrawn.

If the tubes are for instance produced by a coiling process then the aforementioned known withdrawing apparatus is not suitable, since it imparts to the tubes only translatory and not at the same time necessary rotational moving components. While it is possible to construct the above-described withdrawal apparatus with two or more endless bands also in such a manner that these bands will not move only in longitudinal direction but simultaneously rotate about the axis of the material to be withdrawn, such apparatus will be extremely expensive and complicated to construct and the space requirements of such apparatus will also be considerable.

SUMMARY OF THE INVENTION

It is an object of the present invention to provide an apparatus for withdrawing strand-like material in longitudinal direction, especially tubes and conductors for high frequency cables, which avoids the above-mentioned disadvantages of such apparatus known in the art.

It is a further object of the present invention to provide a withdrawal apparatus of the aforementioned kind in which especially deformation of the withdrawn strand-like material or damage to the outer surface thereof is positively avoided.

It is an additional object of the present invention to provide an apparatus of the aforementioned kind which permits a translatory and/or rotary movement of the material to be withdrawn.

It is yet another object of the present invention to provide an apparatus of the aforementioned kind which is composed of relatively few and simple elements so that the apparatus may be constructed at reasonable cost and will stand up perfectly under extended use.

With these and other objects in view, which will become apparent as the description proceeds, the apparatus according to the present invention for withdrawing strand-like material in longitudinal direction, especially tubes and conductors for high frequency cables, mainly comprises at least two gripping means adapted to surround the strand-like material coaxially therewith and being axially spaced from each other, moving means cooperating with the gripping means for moving the latter in axial direction toward and away from each other, and control means for controlling the gripping means for tightly gripping the strand-like material during movement of the respective gripping means in the withdrawal direction and for releasing the strand-like material during movement of the respective gripping means in a direction opposite to the withdrawal direction. The gripping means, coaxially arranged about the strand-like material, will therefore alternately produce a withdrawal of the material. During the time at which the first gripping means transports the strand-like material in the withdrawal direction, the second gripping means will return in the opposite direction to its starting position and subsequently, during its movement in the withdrawal direction, grip the material, while the first gripping means, during its return movement, releases the material. In this way, the strand-like material will be continuously moved in the withdrawal direction. A special advantage of the apparatus according to the present invention is that the gripping means do not have to be moved out of the axis of the strand-like material to be withdrawn. This will make it possible to construct the gripping means in an advantageous manner.

The aforementioned gripping means preferably comprise a housing, a tubular member in the housing and mounted turnable about its axis, a plurality of gripping jaws arranged closely adjacent to each other along a circle coaxial with the aforementioned axis, and operating means arranged between the tubular member and the jaws connected to the latter and to the tubular member for pressing the jaws against the strand-like material during movement of the respective gripping means in withdrawal direction and for releasing the strand-like material during movement of the gripping means in opposite direction. The operating means may comprise for instance pneumatic or hydraulically operated cylinder and piston means or diaphram cells which press the gripping jaws with adjustable, uniform pressure against the strand-like material. Due to the plurality of gripping jaws which surround the strand-like material a uniform pressure on all sides of the latter is obtained. A deformation of the strand-like material due to one sided pressure action is, therefore, avoided.

The moving means for moving the gripping means in longitudinal direction preferably comprise an elongated screw spindle extending parallel to the axis of the gripping means, and a nut mounted in the housing turnable about its axis but immovable in axial direction and threadingly engaging the spindle, a brake motor mounted on the housing and operatively connected to the nut, a prime mover connected to the spindle for rotating the same about its axis, and a pair of means for each of the brake motors spaced in axial direction of the spindle from each other for switching the respective brake motor on and off. The brake motor when switched off acting as a brake to prevent rotation of the nut connected thereto so that the housing of the respective gripping means is moved by the rotating spindle in withdrawal direction, and the brake motor when switched on rotating the nut in a direction opposite to the direction of rotation of the spindle at a rotational speed greater than that of the spindle to move thereby the housing of the respective gripping means in a direction opposite to the withdrawal direction. By suitably selecting the time sequence of the operation of the brake motors it is possible to obtain the necessary movement of the gripping means for withdrawing the strand-like material in the withdrawal direction. A special advantage of the arrangement resides also in the fact that the speed of withdrawal and therefore the length of withdrawal per time unit may be changed within wide limits in a very simple manner to adapt such speed to the speed at which the strand-like material is produced. Thus, for instance, it is possible to withdraw the strand-like material in such a manner that the second gripping means already engage the strand-like material to move the latter in withdrawal direction before the strand-like material is released from the first gripping means, and vice versa. In this way, a continuous uniform withdrawal of the strand-like material is assured.

In accordance with a further advantageous development according to the present invention, the position of the pair of means for each brake motor to switch the latter on and off is adjustable in the direction of movement of the gripping means. The apparatus may further include means for continuously changing the position of these means for each brake motor within narrow limits and in an irregular manner. This will assure that any minute deformations produced by the gripping means on the strand-like material to be withdrawn will occur only in irregular distances along the length of the material so that such minute deformations will not have disadvantageous results in coaxial high frequency cables.

In accordance with a further development of the apparatus of the present invention, the tubular member in the housing of the gripping means is not only turnably mounted therein, but means are provided for rotating the tubular member about its axis. In this way, the apparatus according to the present invention is especially adapted for withdrawing tubular member which are produced by coiling. In this modification, a rotary movement of the strand-like material is superimposed to the translatory movement thereof, and this result can be obtained with a relatively simple construction without increasing the space requirements of the apparatus in any essential manner.

The novel features which are considered as characteristic for the invention are set forth in particular in the appended claims. The invention itself, however, both as to its construction and its method of operation, together with additional objects and advantages thereof, will be best understood from the following description of specific embodiments when read in connection with the accompanying drawing.

DESCRIPTION OF THE PREFERRED EMBODIMENTS

Figure 1:
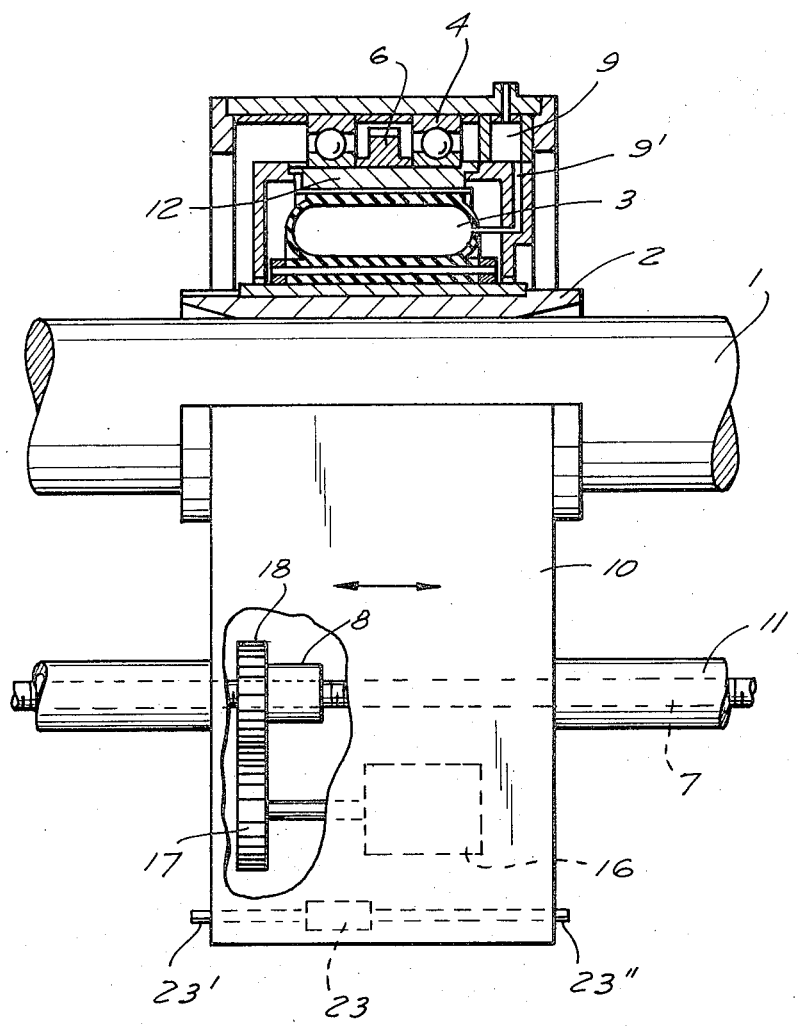
FIG. 1 is a schematic partially sectioned side view of one of the gripping means of the apparatus.
Figure 2:
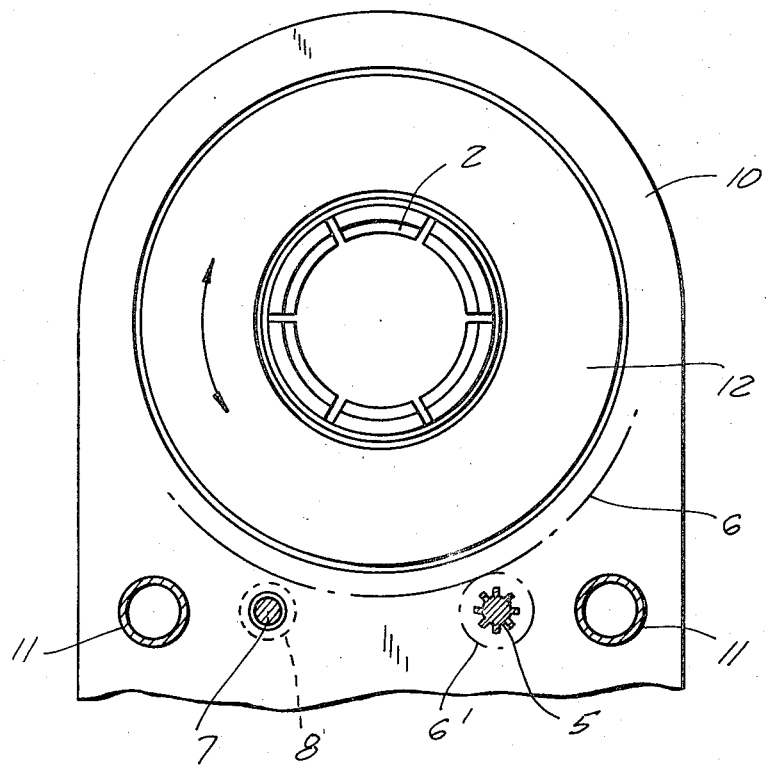
FIG. 2 is a schematic partial end view of the apparatus shown in FIG. 1.

FIGS. 1 and 2 illustrate one of the gripping means of the apparatus according to the present invention in a partially sectioned side view as well as in a partially sectioned end view. The gripping means as shown in FIGS. 1 and 2 comprise a housing 10 surrounding the strand-like material 1 shown scehmatically in FIG. 1, which may comprise an elongated conductor of circular cross section or a thin walled tube as for instance schematically shown in FIGS. 3 and 4. The housing 10 is guided for movement in the axial direction of the member 1 to be withdrawn by a pair of elongated stationarily arranged guide members 11, which may for instance be tubes as shown in FIG. 2, which extend through and are slidingly guided in appropriate bores of the housing 10. A hollow tubular member 12 is mounted in the housing 10, preferably by a pair of roller bearings 4, for rotation about its axis and immovable in axial direction. The strand-like material 1 to be withdrawn is surrounded by a plurality of clamping or gripping jaws 2 arranged closely to each other and which are curved in circumferential direction, as best shown in FIG. 2, so that the strand-like material 1 is substantially encompassed by the clamping jaws 2 along the whole circumference thereof. Operating means 3 are located between the tubular member 12 and the clamping jaws 2 for pressing the latter against the strand-like material 1, and the operating means 3 are supplied with pressure fluid, for instance hydraulic fluid or air under pressure, from an annular chamber 9 formed in the housing 10 through channels 9' formed in a member rotating with and fixed to the tubular member 12. The operating means 3 may comprise individual expandable and contractable members, such as cylinder and piston means or diaphragm cells, one for each of the clamping jaws 2, or an annular, hollow contractable and expandable member of flexible material interposed between the tubular member 12 and the plurality of clamping jaws and fixedly connected to the latter and the tubular member 12. In the latter case, only a single channel 9 has to be provided for connecting the chamber 9 to the interior of the member 5. The chamber 9 is in turn supplied with pressure fluid through a flexible connection, not shown in FIG. 1, in which a two-way valve, likewise not shown in FIG. 1, is arranged which is movable between a first position connecting the chamber 9 with a source of pressure fluid, not shown in the drawing, and a second position in which the chamber 9 is connected to the outer atmosphere to thereby release pressure produced by the operating means 3 on the clamping jaws in the second position of the valve.

The housing 10 and the elements mounted therein are movable along the guide members 11 in withdrawal direction and in a direction opposite thereto as indicated by the double arrow shown in FIG. 1. In order to move the housing 10 in the withdrawal direction, for instance toward the right as shown in FIG. 1, a nut 8 is mounted in the lower part of the housing 10 turnably about its axis, but immovable in axial direction. An elongated screw spindle 7 extending parallel to and between the guide members 11 meshes with the threads of the nut 8, and the latter may be held, in a manner as will be described later on, non-rotatable, so that during turning of the spindle 7 the housing will be moved in longitudinal direction, for instance toward the right as viewed in FIG. 1. In order to rotate the tubular member 12 with the clamping jaws 2 carried thereby about the axis of the tubular member, a gear 6' is mounted in the housing turnable about its axis but immovable in axial direction and the gear 6' meshes with a gear 6 connected coaxially to the tubular member 12 for rotation therewith. A driven spline shaft 5 extending parallel to the screw spindle 7 drives the gear 6', and the gear 6' can evidently move in longitudinal direction of the spline shaft 5 so that the tubular member 12 and the clamping jaws carried thereby may be rotated while the housing moves in longitudinal direction of the guide members. In this way, a translatory and rotary movement is transmitted by the clamping jaws 2 to the strand-like element 1. If only a translatory movement is desired, then the drive for for the spline shaft 5 is simply stopped. In this way, the apparatus is perfectly adapted to withdraw strand-like elements of a various nature, for instance tubes with a longitudinal weld seam as well as tubes formed by a coiling operation. The disclosed drive has also the advantage that the screw spindle 7 is self-locking and substantially non-elastic and non-elongatable, which compares favorably with drives in which chains or belts are used for moving the jaws in longitudinal direction. As long as the spindle 7 is rotated and the nut 8 is held stationarily in the housing 10, the drive will proceed in perfectly uniform manner. The clamping jaws 2 are preferably exchangeable so that they can be exactly adapted to the outer diameter of the member which has to be withdrawn.

As mentioned befpre, the withdrawal apparatus includes at least two gripping means movable in axial direction of the strand-like material to be withdrawn from a first end position toward each other to a second end position and back to the first end position, whereby the clamping jaws 2 of the gripping means which moves in the withdrawal direction are engaged with the strand-like member 1 so as to move the latter in the withdrawl direction, while the clamping jaws of the other gripping means which moves in the direction opposite to the withdrawal direction are released so that this gripping means may move back to its starting position. As further mentioned above, the nut 8 has to be held non-rotatable in the housing 10 so as to move the housing of the respective gripping means in withdrawal direction by rotating the spindle 7.

In order to hold the nut 8 non-rotatable in the housing 10, there is provided on an extension of the housing a brake motor 16, the output shaft of which carries fixedly connected thereto a gear 17 which meshes with a gear 18 integral with the nut 8. The brake motor 16 can be switched on and off in a manner as will be described later on and the brake motor is constructed in such a manner that, when switched off, it will hold the nut 8 connected thereto over the gear transmission 17, 18 stationarily so that the housing 10 and the elements carried thereby will, when the spindle 7 is rotated, move in the withdrawal direction, for instance, toward the right as viewed in FIG. 1.

Figure 3:
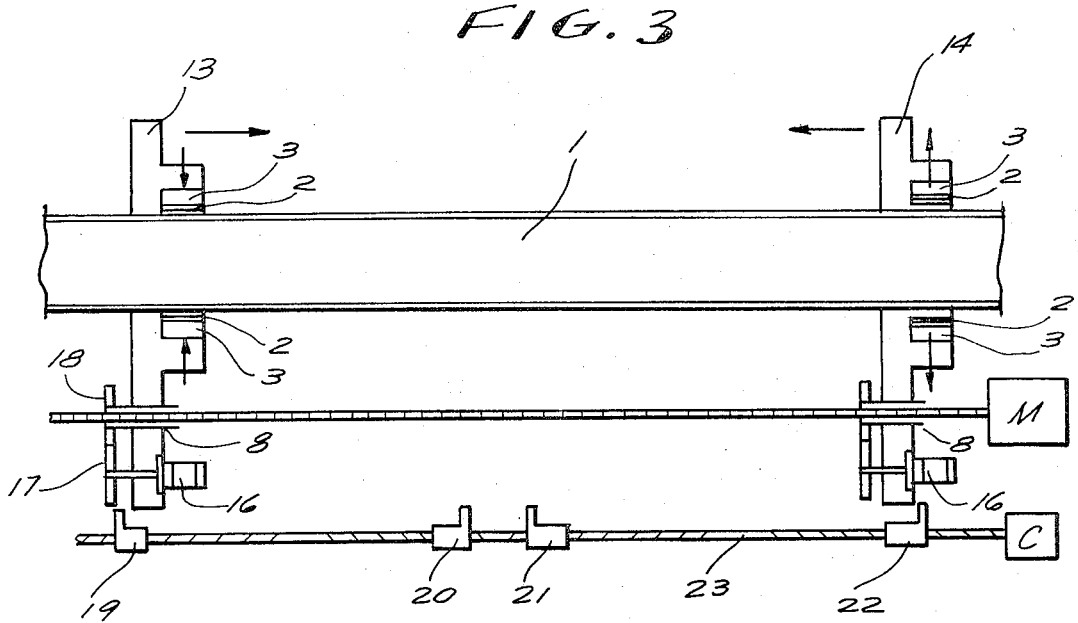
FIG. 3 is a schematic, sectioned side view of an apparatus including two gripping means showing the latter during movement thereof toward each other.
Figure 4:
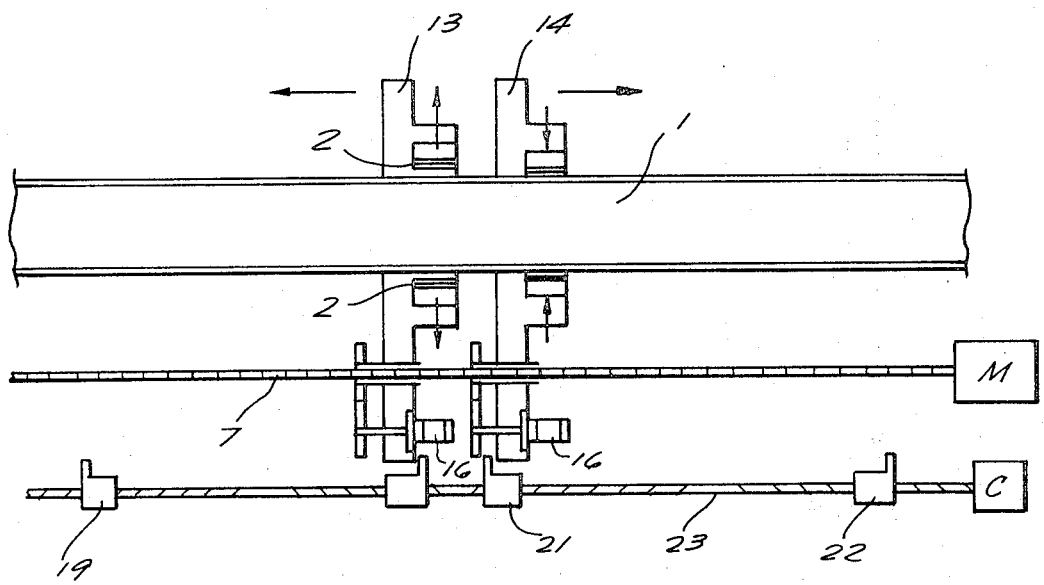
FIG. 4 is a schematic side view similar to FIG. 3 and illustrating the gripping means in their closest position at which they start to move away from each other.

FIGS. 3 and 4 scehmatically illustrate a withdrawing apparatus comprising two gripping means 13 and 14. FIG. 3 shows the moment in which the two gripping means 13 and 14 are spaced farthest from each other and start to move toward each other. As shown in FIG. 3 in a schematic manner, the operating means 3 of the gripping means 13 are inflated so that the clamping jaws 2 of this gripping means tightly engage the tube 1, whereas the operating means 3 of the gripping means 14 are deflated and the clamping jaws 2 of this gripping means may move freely in longitudinal direction of the tube 1. The brake motor 16 of the gripping means 13 is switched off so that the nut 8 of this gripping means is held stationarily by the gear transmissions 17, 18 between the brake motor and the nut 8, the spindle 7 is rotated by the motor M in such a direction that the gripping means 13 will move toward the right, as viewed in FIG. 3, so that the tube 1 will be moved in withdrawal direction by the engaged jaws 2 of the gripping means 13. The brake motor 16 of the gripping means 14, on the other hand, is switched on to thereby rotate the nut 8 of the gripping means 14 in a direction opposite to the direction of rotation of the spindle 7 and at such a speed that the gripping means 14 will move substantially at the same speed toward the left as the gripping means 13 which moves the tube in the withdrawal direction, moves toward the right.

After a certain elapse of time, the two gripping means 13 and 14 will reach their closed position, as schematically illustrated in FIG. 4, and when the two gripping means reach the position as shown in FIG. 4, the operating means 3 of the gripping means 13 are deflated and the operating means 3 of the gripping means 14 are inflated so that the jaws 2 of the gripping means 14 will now tightly engage the tube 1, whereas the jaws 2 of the gripping means 13 will release the tube. At the same time, the brake motor 16 of the gripping means 14 is switched off, holding thereby the nut 8 of the gripping means 14 stationarily, so that the gripping means 14 moves now towards the right, as viewed in FIG. 4, to thereby move the tube 1 likewise toward the right, whereas the brake motor 16 of the gripping means 13 is switched on, to thereby rotate the nut 8 of the gripping means 13 so as to move the latter toward the left, as viewed in FIG. 4 to the starting position as shown in FIG. 3.

The brake motors 16 are only schematically indicated in FIGS. 1, 3 and 4 and such brake motors are very well known in the art and for instance produced by the German company Demag.

In order to automatically switch on or off the brake motors 16 when the gripping means 13 and 14 reach the end positions as shown in FIGS. 3 and 4, there may be provided for each gripping means 13 and 14 a pair of abutment members spaced in longitudinal direction of the spindle 7 from each other, as schematically indicated in FIGS. 3 and 4 in which two abutment member 19 and 20 are shown for the brake motor 16 of the gripping means 13 and two abutment members 21 and 22 are shown for the brake motor 16 of the gripping means 14. These abutment members have a portion located in the path of the housing extension of each gripping to respectively engage operating portions 23' or 23'' of a switch 23 in circuit with the respective brake motor 16 in such a manner that, when for instance the gripping means 13 reaches its end position as shown in FIG. 3 the brake motor 16 of this gripping means is switched off the thereby hold the nut 8 stationarily, while when the gripping 13 reaches its end position as shown in FIG. 4 its brake motor is automatically switched on to rotate the nut 8 thereof in a direction which causes the gripping means to move toward the left, as view in FIG. 4, back to its starting position, shown in FIG. 3. The abutment members 21 and 22 for the brake motor 16 of the gripping means 14 will cooperate correspondingly with a switch connected to the brake motor 16 of the gripping means 14.

The aforementioned switches may also be used for operating the above-mentioned valves which respectively connect the interior of the members 3 to a source of pressure fluid or to the outer atmosphere and such valves may be solenoid operated valves connected in circuit with the aforementioned switches so that when for instance the gripping means 13 reaches its position as shown in FIG. 3 the operating means 3 are automatically inflated and deflated when the gripping means 13 reaches its end position, as shown in FIG. 4. While the means for switching the brake motors 16 on and off are shown in the drawing as including abutment means, other means well known in the art, for instance electric eyes, may also be used for this purpose.

The abutment members 19–22 are preferably mounted adjustable toward and away from each other to thereby vary the stroke along which each of the gripping means moves in the withdrawal and in the opposite direction. According to a further refinement of the disclosed apparatus, the position of the abutment means 19–22 relative to each other may be changed within narrow limits and at irregular time intervals so that the end positions of the gripping means 13 and 14 respectively shown in FIGS. 3 and 4 may also correspondingly be changed within narrow limits. For this purpose, the abutment means 19–22 may, for instance, be mounted on a screw spindle 23 rotatable in one direction and in the opposite direction and having in the region of the abutment means 19 and 21 right hand thread portions, for instance, and in the region of the abutment means 20 and 22, left hand thread portions. Control means C of known construction cooperate with the screw spindle 23 to rotate the latter at an irregular rhythm and for varying short time intervals in the respective direction to thereby adjust the position of the abutment members 19 and 20 and of the abutment members 21 and 22 relative to each other within narrow limits in a completely irregular manner. This will assure that minute deformations imparted to the strand-like element 1, for instance a thin walled tube, which has to be withdrawn by the apparatus, during engagement of the clamping jaws 2 of the respective gripping means with the outer surface of the tube will be distributed along the length of the tube in a nonuniform manner. It is to be understood that the bores in the abutment means 19–22 are formed with internal threads meshing with the thread portions of the spindle 23 and that guide means, not shown in the drawing, cooperate with the abutment means to prevent rotation of the same about the spindle 23.

Figure 5:
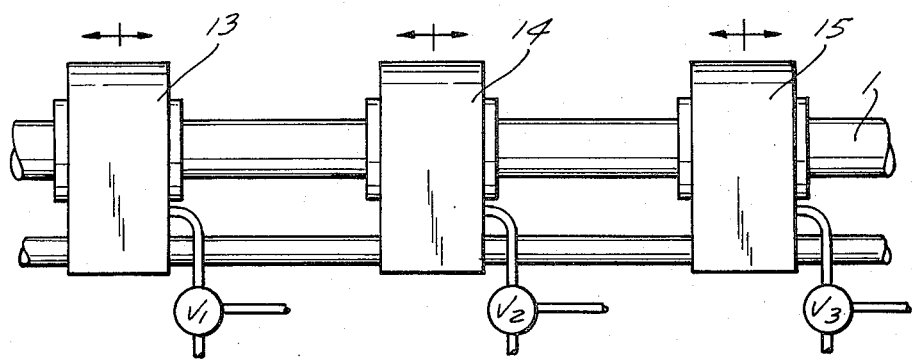
FIG. 5 is a schematic side view of an apparatus in which three gripping means are provided axially spaced from each other.

FIG. 5 shows schematically an overall arrangement in which the apparatus includes three gripping means, that is the gripping means 13, 14 and 15 which are movable along the guide members 11 described in connection with FIGS. 3 and 4 in opposite directions, as indicated by the double-headed arrows. FIG. 5 shows also the above-mentioned valve members $V_1$, $V_2$ and $V_3$ for feeding pressure fluid into the operating members 3, not shown in FIG. 5, of each of the gripping means or for releasing such pressure from the members 3. The gripping means 13–15 will alternatingly move toward the right and toward the left, and assuming the withdrawal direction is toward the right, as viewed in FIG. 5, the operating means 3 are inflated in at least one of the three gripping means shown which moves in the withdrawal direction.

It will be understood that each of the elements described above, or two or more together, may also find a useful application in other types of withdrawal apparatus differing from the types described above.

While the invention has been illustrated and described as embodied in a withdrawal apparatus including at least two gripping means movable toward and away from each other and alternatingly engaging the strand-like element to move the latter in withdrawal direction, it is not intended to be limited to the details shown, since various modifications and structural changes may be made without departing in any way from the spirit of the present invention.

Without further analysis, the foregoing will so fully reveal the gist of the present invention that other can by applying current knowledge readily adapt it for various applications without omitting features that, from the standpoint of prior art, fairly constitute essential characteristics of the generic or specific aspects of this invention and, therefore such adaptations should and are intended to be comprehended within the meaning and range of equivalence of the following claims.

What is claimed as new and desired to be protected by Letters Patent is:

1. Apparatus for withdrawing strand-like material in longitudinal direction, especially tubes and conductors for high frequency cables, comprising, in combination, at least two gripping means adapted to surround the strand-like material coaxially therewith and axially spaced from each other; and moving means cooperating with said gripping means for moving the latter in axial direction between two end positions toward and away from each other, each of said gripping means comprising a housing, a tubular member having an axis and being mounted in said housing turnably about said axis, a plurality of gripping jaws arranged closely adjacent to each other along a circle coaxial with said axis, and operating means arranged between and connected to said tubular member and said jaws for pressing the jaws against the strand-like material during movement of the respective gripping means in the withdrawal direction and for releasing the strand-like material during movement of said gripping means in the opposite direction.

2. Apparatus as defined in claim 1, wherein said operating means comprises a hollow member of resiliently flexible material and means for feeding pressure fluid into said member and discharging the pressure fluid therefrom.

3. Apparatus as defined in claim 1, wherein said moving means comprise an elongated screw spindle extending parallel to the axis of said gripping means, a nut mounted in said housing turnably about the axis but immovably in axial direction and threadingly engaging said spindle, a brake motor mounted on said housing and operatively connected to said nut, a prime mover connected to said spindle for rotating the same about its axis, and a pair of means for each of said brake motors spaced in axial direction to said spindle from each other for switching the respective brake motor on when the respective gripping means reaches one of its end positions, and for switching said brake motor off when the gripping means reaches the other of its end positions, said brake motor, when switched off, acting as a brake to prevent rotation of the nut connected thereto so that the housing means of the respective gripping means is moved by the rotating spindle in withdrawal direction, and the brake motor, when switched on, rotating said nut in a direction opposite to the rotation of said spindle and at a rotational speed greater than that of said spindle to move thereby the housing means of the respective gripping means in a direction opposite to said withdrawal direction.

4. Apparatus as defined in claim 3, wherein the connection between said brake motor and said nut comprises a gear transmission.

5. Apparatus as defined in claim 3, and including means mounting said pair of means for switching each brake motor on and off adjustable in the direction of movement of said gripping means.

6. Apparatus as defined in claim 5, and including means for changing the position of said pair of means for switching each brake motor on and off within narrow limits and in an irregular manner.

7. Apparatus as defined in claim 1, and including means for rotating said tubular member about its axis, together with said operating means and said clamping jaws connected thereto.

8. Apparatus as defined in claim 7, wherein said means for rotating said tubular member about its axis comprises an external gear coaxially fixed to said tubular member, a pinion meshing with said gear and turnably but axially immovably mounted in said housing, and a driven spline shaft for driving said pinion.

9. Apparatus as defined in claim 1 and including guide means mounting said housing movable in said withdrawal direction and in a direction opposite thereto.

10. Apparatus for withdrawing strand-like material in longitudinal direction, especially tubes and conductors for high frequency cables, comprising, in combination, at least two gripping means adapted to surround the strand-like material coaxially therewith and axially spaced from each other, each of said gripping means comprising gripping jaws movable between a gripping position tightly gripping the strand-like material and a releasing position, and means mounting said gripping jaws movable between said positions and turnable about the axis of the strand-like material; moving means cooperating with said gripping means for moving the latter in axial direction between two end positions toward and away from each other; and means for controlling said gripping jaws for tightly gripping the strand-like material during movement of the gripping means in the withdrawal direction and for releasing the strand-like material during movement of the respective gripping means in a direction opposite to said withdrawal direction.

* * * * *